(12) United States Patent
Judge et al.

(10) Patent No.: US 11,105,345 B2
(45) Date of Patent: *Aug. 31, 2021

(54) FLUID EXCHANGE DEVICES AND RELATED SYSTEMS, AND METHODS

(71) Applicant: Flowserve Management Company, Irving, TX (US)

(72) Inventors: Scott Judge, Bethlehem, PA (US); Nathan Terwilliger, Bethlehem, PA (US); A.K. Necioglu, Macungie, PA (US)

(73) Assignee: Flowserve Management Company, Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/033,307

(22) Filed: Sep. 25, 2020

(65) Prior Publication Data

US 2021/0010489 A1    Jan. 14, 2021

Related U.S. Application Data

(63) Continuation of application No. 16/678,954, filed on Nov. 8, 2019, now Pat. No. 10,865,810.

(Continued)

(51) Int. Cl.
*F04F 13/00* (2009.01)
*F16K 47/02* (2006.01)
(Continued)

(52) U.S. Cl.
CPC ............ *F04F 13/00* (2013.01); *E21B 43/126* (2013.01); *E21B 43/26* (2013.01); *F16K 11/07* (2013.01);
(Continued)

(58) Field of Classification Search
CPC .......... F04F 13/00; F16K 47/02; F16K 47/04; F16K 47/08; F16K 11/065; F16K 11/07;
(Continued)

(56) References Cited

U.S. PATENT DOCUMENTS 1,577,242 A ‡ 3/1926 Andersen .................. F01L 1/46
123/18
1,647,189 A ‡ 11/1927 Mueller .................... E03D 3/04
137/24
(Continued)

FOREIGN PATENT DOCUMENTS

CN       101705930 B  ‡  2/2012  .......... F04B 39/0038
CN       102421513 A  ‡  4/2012  ................ E21F 3/00
(Continued)

OTHER PUBLICATIONS

PCT International Patent Application No. PCT/US2019/060603, Written Opinion dated Mar. 12, 2020, 5 pp.‡
(Continued)

*Primary Examiner* — David Colon-Morales
(74) *Attorney, Agent, or Firm* — Phillips Winchester

(57) ABSTRACT

Devices and systems for exchanging properties between at least two fluid streams and related methods may include a valve device comprising a valve actuator configured to move at variable rates in order to selectively fill and empty at least one tank. Devices for exchanging properties between at least two fluid streams may include a valve device comprising offset openings positioned along a path of a valve actuator. The offset openings may be configured to selectively and gradually place an inlet in communication with at least one tank.

20 Claims, 5 Drawing Sheets

Related U.S. Application Data

(60) Provisional application No. 62/758,359, filed on Nov. 9, 2018.

(51) Int. Cl.
*E21B 43/26* (2006.01)
*F16K 11/07* (2006.01)
*E21B 43/12* (2006.01)

(52) U.S. Cl.
CPC ........ *F16K 47/02* (2013.01); *Y10T 137/86767* (2015.04)

(58) Field of Classification Search
CPC ......... F16K 11/0708; Y10T 137/86734; Y10T 137/86767; E21B 43/26; E21B 43/2607; E21B 43/27
See application file for complete search history.

(56) References Cited

U.S. PATENT DOCUMENTS

| | | | | | |
|---|---|---|---|---|---|
| 1,647,734 A ‡ | 11/1927 | Kelly | F16K 3/18 | | 137/24 |
| 1,769,672 A ‡ | 7/1930 | Blair | F01L 3/08 | | 123/41 |
| 2,365,046 A ‡ | 12/1944 | Bottomley | F16J 15/38 | | 277/39 |
| 2,600,836 A ‡ | 6/1952 | Boyd | F16K 25/02 | | 137/23 |
| 2,615,465 A ‡ | 10/1952 | Woodward | F16K 29/00 | | 137/24 |
| 2,860,266 A ‡ | 11/1958 | Schrader | F16K 31/046 | | 310/112 |
| 2,897,762 A ‡ | 8/1959 | Houvener | F04B 53/1087 | | 417/387 |
| 3,089,504 A ‡ | 5/1963 | Crawford | F16K 1/42 | | 137/24 |
| 3,223,173 A ‡ | 12/1965 | Paul, Jr. | A62C 13/006 | | 169/76 |
| 3,347,554 A ‡ | 10/1967 | Jagger | F16J 15/3244 | | 277/55 |
| 3,570,510 A ‡ | 3/1971 | Tsutsumi | F16K 1/2085 | | 137/15 |
| 3,583,606 A ‡ | 6/1971 | Ewald | B65D 83/34 | | 222/40 |
| 3,595,265 A ‡ | 7/1971 | Cryder | F15B 21/041 | | 137/51 |
| 3,612,361 A ‡ | 10/1971 | Ewald | B05B 7/1245 | | 222/40 |
| 3,661,167 A ‡ | 5/1972 | Hussey | F04B 43/02 | | 137/26 |
| 3,661,400 A ‡ | 5/1972 | Weinand | F16J 15/3244 | | 277/55 |
| 3,675,825 A ‡ | 7/1972 | Morane | B65D 83/682 | | 222/14 |
| 3,675,935 A ‡ | 7/1972 | Ludwig | F16J 15/342 | | 277/40 |
| 3,722,854 A ‡ | 3/1973 | Parola | F16K 47/08 | | 251/127 |
| 3,741,243 A ‡ | 6/1973 | Deibler | F16K 15/04 | | 137/52 |
| 3,749,291 A ‡ | 7/1973 | Prussin | B65D 83/34 | | 222/40 |
| 3,756,273 A ‡ | 9/1973 | Hengesbach | F16K 15/026 | | 137/54 |
| 3,776,278 A ‡ | 12/1973 | Allen | F16K 47/08 | | 137/62 |
| 3,813,079 A ‡ | 5/1974 | Baumann | F16K 47/08 | | 251/127 |
| 3,921,668 A ‡ | 11/1975 | Self | F16K 47/08 | | 137/625.3 |
| 4,024,891 A ‡ | 5/1977 | Engel | F16K 47/04 | | 137/62 |
| 4,123,332 A ‡ | 10/1978 | Rotter | C10B 47/44 | | 201/15 |
| 4,133,346 A ‡ | 1/1979 | Smith | B60K 15/0406 | | 137/49 |
| 4,134,454 A ‡ | 1/1979 | Taylor | E21B 34/10 | | 166/32 |
| 4,176,063 A ‡ | 11/1979 | Tyler | B01D 61/08 | | 210/10 |
| 4,234,010 A ‡ | 11/1980 | Jenkins | B01J 3/02 | | 137/24 |
| 4,236,547 A ‡ | 12/1980 | Harasewych | F16K 3/24 | | 137/24 |
| 4,244,555 A ‡ | 1/1981 | Maggioni | A01G 25/16 | | 251/34 |
| 4,249,574 A ‡ | 2/1981 | Schnall | F15C 1/02 | | 137/625.3 |
| 4,308,103 A ‡ | 12/1981 | Rotter | C10B 7/10 | | 201/25 |
| 4,321,021 A ‡ | 3/1982 | Pauliukonis | F04B 17/042 | | 222/34 |
| 4,350,176 A ‡ | 9/1982 | Lace | F16K 17/04 | | 137/24 |
| 4,412,632 A ‡ | 11/1983 | Berger | B65D 47/2031 | | 222/14 |
| 4,424,917 A ‡ | 1/1984 | Berger | B65D 83/14 | | 222/10 |
| 4,473,210 A ‡ | 9/1984 | Brighton | F16K 47/045 | | 137/625.3 |
| 4,479,356 A ‡ | 10/1984 | Gill | F16F 1/14 | | 60/699 |
| 4,479,509 A ‡ | 10/1984 | Dear | F16K 47/02 | | 137/375 |
| 4,510,963 A ‡ | 4/1985 | Presley | A01D 41/1274 | | 137/10 |
| 4,518,006 A ‡ | 5/1985 | Hoffmann | E03C 1/104 | | 137/21 |
| 4,570,853 A ‡ | 2/1986 | Schmied | F02M 45/086 | | 239/11 |
| 4,579,511 A ‡ | 4/1986 | Burns | E21B 43/122 | | 417/10 |
| 4,586,692 A ‡ | 5/1986 | Stephens | E03D 3/04 | | 137/21 |
| 4,627,461 A ‡ | 12/1986 | Gordon | F16K 29/00 | | 137/24 |
| 4,726,530 A ‡ | 2/1988 | Miller | B29B 17/02 | | 241/19 |
| 4,768,542 A ‡ | 9/1988 | Morris | F16T 1/14 | | 137/20 |
| 4,834,193 A ‡ | 5/1989 | Leitko, Jr. | E21B 4/145 | | 173/91 |
| 4,999,872 A ‡ | 3/1991 | Jentsch | E05F 3/102 | | 16/58 |
| 5,033,557 A ‡ | 7/1991 | Askew | E21B 31/1135 | | 175/29 |
| 5,070,817 A ‡ | 12/1991 | Momont | A01K 39/02 | | 119/75 |
| 5,172,918 A ‡ | 12/1992 | Pecht | F16J 15/002 | | 277/40 |
| 5,232,013 A ‡ | 8/1993 | Morris | F16K 15/063 | | 137/51 |
| 5,234,031 A ‡ | 8/1993 | Pickett | B60T 8/3615 | | 137/11 |
| 5,240,036 A ‡ | 8/1993 | Morris | F16K 15/063 | | 137/51 |
| 5,299,859 A ‡ | 4/1994 | Tackett | B60T 8/3615 | | 137/59 |
| 5,300,041 A ‡ | 4/1994 | Haber | A61M 5/24 | | 604/20 |
| 5,357,995 A ‡ | 10/1994 | King | B01J 4/02 | | 134/16 |
| 5,431,188 A ‡ | 7/1995 | Cove | E21B 34/02 | | 137/625.3 |
| 5,797,429 A ‡ | 8/1998 | Shumway | B01D 61/06 | | 137/62 |
| 5,951,169 A ‡ | 9/1999 | Oklejas | F16C 33/1065 | | 384/12 |

(56) References Cited

U.S. PATENT DOCUMENTS

| | | | | |
|---|---|---|---|---|
| 5,992,289 A ‡ | 11/1999 | George | ............ | E21B 43/11855 166/29 |
| 6,030,174 A ‡ | 2/2000 | Maier | .................... | F16K 47/08 415/150 |
| 6,036,435 A ‡ | 3/2000 | Oklejas | ................ | F16C 33/102 415/10 |
| 6,126,418 A ‡ | 10/2000 | Sinnl | .................... | B60T 8/4031 417/27 |
| 6,244,297 B1 ‡ | 6/2001 | Baumann | ............... | F16K 47/08 137/625.3 |
| 6,293,245 B1 ‡ | 9/2001 | Bock | ....................... | F16J 15/04 123/19 |
| RE37,921 E ‡ | 12/2002 | Martin | ..................... | E03D 3/10 4/361 |
| 6,516,897 B2 ‡ | 2/2003 | Thompson | ............. | E04H 12/34 175/19 |
| 6,540,487 B2 ‡ | 4/2003 | Polizos | ................ | F04B 1/2042 417/65 |
| 6,607,368 B1 ‡ | 8/2003 | Ross | .................... | F04B 43/084 417/41 |
| 6,647,938 B2 ‡ | 11/2003 | Gaessler | ................. | F01M 1/02 123/17 |
| 6,659,731 B1 ‡ | 12/2003 | Hauge | ....................... | F15B 3/00 417/64 |
| 7,128,084 B2 ‡ | 10/2006 | Long | ...................... | F16H 61/12 137/23 |
| 7,201,557 B2 ‡ | 4/2007 | Stover | .................... | F04F 13/00 415/10 |
| 7,306,437 B2 ‡ | 12/2007 | Hauge | ..................... | B01D 61/06 417/64 |
| 7,474,013 B2 ‡ | 1/2009 | Greenspan | .......... | F03B 13/1885 290/53 |
| 7,540,230 B2 ‡ | 6/2009 | Rojanskiy | .............. | B01D 61/06 137/625.66 |
| 7,670,482 B2 ‡ | 3/2010 | Wietham | ............... | F04D 29/708 210/16 |
| 7,766,041 B2 ‡ | 8/2010 | Tackes | ................ | F16K 31/0613 137/625.3 |
| 7,871,522 B2 ‡ | 1/2011 | Stover | ................... | F01K 27/005 210/65 |
| RE42,432 E ‡ | 6/2011 | Stover | .................... | F04F 13/00 415/10 |
| 7,997,853 B2 ‡ | 8/2011 | Pique | ..................... | B01D 61/10 415/90 |
| 8,025,157 B2 ‡ | 9/2011 | Takita | ..................... | C02F 1/441 210/416.2 |
| 8,075,281 B2 ‡ | 12/2011 | Martin | ................... | C02F 1/441 417/64 |
| 8,297,303 B2 ‡ | 10/2012 | DeSantis | ................... | F16K 3/24 137/24 |
| 8,360,250 B2 ‡ | 1/2013 | Nguyen | ............... | F16K 31/402 210/35 |
| 8,465,000 B2 ‡ | 6/2013 | Bartell, Jr. | ............... | F16K 31/04 251/83 |
| 8,579,603 B2 ‡ | 11/2013 | Oklejas | .................. | F04D 13/04 417/40 |
| 8,603,218 B2 ‡ | 12/2013 | Montie | ............. | B01D 46/0001 95/43 |
| 8,622,714 B2 ‡ | 1/2014 | Andrews | ............... | F04B 7/0023 417/64 |
| 8,820,354 B2 ‡ | 9/2014 | Ishikawa | ............... | F16K 3/262 137/614.16 |
| 8,840,118 B1 ‡ | 9/2014 | Giovanardi | .......... | B60G 17/016 280/5.5 |
| 9,004,458 B2 ‡ | 4/2015 | Jouneau | ................ | F16K 31/04 261/43 |
| 9,108,162 B2 ‡ | 8/2015 | Takahashi | ............ | B01D 61/025 |
| 9,151,407 B2 ‡ | 10/2015 | Fontaine | ................. | F16K 47/04 |
| 9,163,737 B2 ‡ | 10/2015 | Andersson | ............ | F16K 15/06 |
| 9,188,237 B2 ‡ | 11/2015 | Dolenti | ................... | F16K 31/04 |
| 9,328,743 B2 ‡ | 5/2016 | Hirosawa | ............. | B01D 61/06 |
| 9,435,354 B2 ‡ | 9/2016 | Lehner | ................. | F04F 13/00 |
| 9,440,895 B2 ‡ | 9/2016 | Arluck | ............... | B01D 53/1462 |
| 9,500,394 B2 ‡ | 11/2016 | Manzo | ................. | F25B 29/003 |
| 9,523,261 B2 ‡ | 12/2016 | Flores | ..................... | E21B 34/14 |
| 9,546,671 B2 ‡ | 1/2017 | Hirosawa | ................. | B01D 1/06 |
| 9,556,736 B2 ‡ | 1/2017 | Sigurdsson | ................ | F04B 1/20 |
| 9,587,752 B2 ‡ | 3/2017 | Montague | ............... | F16K 15/04 |
| 9,587,764 B2 ‡ | 3/2017 | Juhnke | ................. | F16K 47/08 |
| 9,604,889 B2 ‡ | 3/2017 | Arluck | ..................... | F04F 13/00 |
| 9,611,948 B1 ‡ | 4/2017 | Andersson | ............. | F16K 15/18 |
| 9,683,574 B2 ‡ | 6/2017 | Winkler | ............... | F16C 32/0614 |
| 9,695,795 B2 ‡ | 7/2017 | Martin | ..................... | F03B 13/00 |
| 9,739,128 B2 ‡ | 8/2017 | Ghasripoor | ............ | E21B 43/26 |
| 9,739,275 B2 ‡ | 8/2017 | Robison | ................. | F16K 15/00 |
| 9,759,054 B2 ‡ | 9/2017 | Gay | ..................... | F04B 43/0736 |
| 9,764,272 B2 ‡ | 9/2017 | Martin | ..................... | C10L 3/10 |
| 9,835,018 B2 ‡ | 12/2017 | Krish | ..................... | E21B 43/26 |
| 9,885,372 B2 ‡ | 2/2018 | Arluck | ................... | E21B 43/26 |
| 9,920,774 B2 ‡ | 3/2018 | Ghasripoor | ............ | E21B 43/26 |
| 9,945,210 B2 ‡ | 4/2018 | Theodossiou | ......... | E21B 43/267 |
| 9,945,216 B2 ‡ | 4/2018 | Ghasripoor | ............ | E21B 43/16 |
| 9,970,281 B2 ‡ | 5/2018 | Ghasripoor | ............ | E21B 43/36 |
| 9,975,789 B2 ‡ | 5/2018 | Ghasripoor | ............ | E21B 43/20 |
| 9,976,573 B2 ‡ | 5/2018 | Martin | ................... | F04F 13/00 |
| 10,001,030 B2 ‡ | 6/2018 | Krish | ..................... | B01D 53/14 |
| 10,006,524 B2 ‡ | 6/2018 | Crump | ................ | F16H 7/0848 |
| 10,024,496 B2 ‡ | 7/2018 | Hauge | ...................... | F17C 1/02 |
| 10,030,372 B2 ‡ | 7/2018 | Di Monte, Sr. | ........ | F16K 15/042 |
| 10,072,675 B2 ‡ | 9/2018 | McLean, Jr. | ............ | E21B 21/062 |
| 10,094,485 B2 ‡ | 10/2018 | Dolenti | .................. | F16K 31/53 |
| 10,119,379 B2 ‡ | 11/2018 | Richter | ................. | E21B 43/267 |
| 10,125,796 B2 ‡ | 11/2018 | Hauge | ..................... | F04F 13/00 |
| 10,138,877 B2 ‡ | 11/2018 | Oklejas, Jr. | ............ | F04B 15/02 |
| 10,138,907 B2 ‡ | 11/2018 | Pinto | ...................... | F04F 99/00 |
| 10,161,421 B2 ‡ | 12/2018 | Oklejas, Jr. | ............. | F04B 53/16 |
| 10,167,710 B2 ‡ | 1/2019 | Ghasripoor | ............ | F04F 13/00 |
| 10,167,712 B2 ‡ | 1/2019 | Ghasripoor | ............ | E21B 43/26 |
| 10,865,810 B2 * | 12/2020 | Judge | ....................... | F16K 11/07 |
| 2002/0025264 A1 ‡ | 2/2002 | Polizos | ................. | F15B 21/047 417/40 |
| 2004/0118462 A1 ‡ | 6/2004 | Baumann | ............... | F16K 3/267 137/62 |
| 2005/0103386 A1 ‡ | 5/2005 | Magda | .................. | F16K 15/026 137/54 |
| 2006/0037895 A1 ‡ | 2/2006 | Shumway | ............... | F04B 19/20 210/137 |
| 2006/0145426 A1 ‡ | 7/2006 | Schroeder | ............... | F16J 15/324 277/55 |
| 2006/0196474 A1 ‡ | 9/2006 | Magel | .................. | F02M 47/027 123/44 |
| 2006/0231577 A1 ‡ | 10/2006 | Powling | ............... | A47K 5/1204 222/32 |
| 2007/0204916 A1 ‡ | 9/2007 | Clayton | .................. | F16K 17/02 137/51 |
| 2009/0057084 A1 ‡ | 3/2009 | Mahawili | ................. | B60M 7/00 191/10 |
| 2009/0104046 A1 ‡ | 4/2009 | Martin | .................... | F04F 13/00 417/65 |
| 2009/0185917 A1 ‡ | 7/2009 | Andrews | ............... | F04B 19/003 417/64 |
| 2009/0313737 A1 ‡ | 12/2009 | Richard | ................. | A41D 13/082 2/20 |
| 2012/0024249 A1 ‡ | 2/2012 | Fuhrmann | ............ | F01L 1/2405 123/90 |
| 2012/0067825 A1 ‡ | 3/2012 | Pique | ....................... | E21F 3/00 210/72 |
| 2012/0217011 A1 ‡ | 8/2012 | Dotson | ................. | E21B 43/114 166/305.1 |
| 2014/0026608 A1 ‡ | 1/2014 | Manzo | .................... | F25B 40/02 62/305 |
| 2014/0048143 A1 ‡ | 2/2014 | Lehner | ................. | B01D 61/06 137/14 |
| 2014/0284058 A1 ‡ | 9/2014 | Watson | .................... | E21B 34/103 166/30 |
| 2015/0130142 A1 ‡ | 5/2015 | Zheng | ..................... | F16J 15/34 277/39 |
| 2015/0184540 A1 ‡ | 7/2015 | Winkler | ............... | F04D 29/0413 416/17 |

(56) References Cited

U.S. PATENT DOCUMENTS

| | | | |
|---|---|---|---|
| 2015/0096739 A1‡ | 9/2015 | Ghasripoor | E21B 43/267 166/10 |
| 2015/0292310 A1‡ | 10/2015 | Ghasripoor | E21B 43/267 166/25 |
| 2016/0032691 A1‡ | 2/2016 | Richter | E21B 43/16 166/25 |
| 2016/0032702 A1‡ | 2/2016 | Gay | E21B 43/16 137/14 |
| 2016/0039054 A1‡ | 2/2016 | Ghasripoor | B23P 6/00 92/172 |
| 2016/0062370 A1‡ | 3/2016 | Gaines-Germain | F04F 13/00 366/15 |
| 2016/0101307 A1‡ | 4/2016 | Montague | E03C 1/104 137/28 |
| 2016/0102536 A1‡ | 4/2016 | Knoeller | F04B 7/0266 417/53 |
| 2016/0138649 A1‡ | 5/2016 | Anderson | F16C 32/06 384/10 |
| 2016/0146229 A1‡ | 5/2016 | Martin | F04F 13/00 92/61 |
| 2016/0153551 A1‡ | 6/2016 | Schiele | F04C 14/26 137/51 |
| 2016/0160849 A1‡ | 6/2016 | Gains-Germain | C07C 273/04 417/37 |
| 2016/0160881 A1‡ | 6/2016 | Anderson | F04F 13/00 415/1 |
| 2016/0160882 A1‡ | 6/2016 | Morphew | F15B 3/00 417/53 |
| 2016/0160887 A1‡ | 6/2016 | Anderson | F15B 15/06 92/61 |
| 2016/0160888 A1‡ | 6/2016 | Morphew | F04F 13/00 92/61 |
| 2016/0160889 A1‡ | 6/2016 | Hoffman | F04F 13/00 60/487 |
| 2016/0160890 A1‡ | 6/2016 | Anderson | F04F 13/00 92/61 |
| 2016/0160917 A1‡ | 6/2016 | Deshpande | F16C 32/0644 384/11 |
| 2016/0215774 A1‡ | 7/2016 | Oklejas | F04B 15/02 |
| 2016/0377096 A1‡ | 12/2016 | Lehner | B01D 61/10 137/14 |
| 2017/0108131 A1‡ | 4/2017 | Andersson | F16K 15/028 |
| 2017/0130743 A1‡ | 5/2017 | Anderson | F15B 3/00 |
| 2017/0211699 A1‡ | 7/2017 | Sasanuma | F16H 61/66259 |
| 2017/0254474 A1‡ | 9/2017 | Sauer | F16T 1/383 |
| 2017/0306986 A1‡ | 10/2017 | McLean, Jr. | F04F 13/00 |
| 2017/0306987 A1‡ | 10/2017 | Theodossiou | E21B 43/126 |
| 2017/0315566 A1‡ | 11/2017 | Martino | E21B 34/02 |
| 2017/0350428 A1‡ | 12/2017 | Martin | F04F 13/00 |
| 2017/0370500 A1‡ | 12/2017 | Haines | F16K 47/08 |
| 2018/0030968 A1‡ | 2/2018 | Verma | E21B 43/26 |
| 2018/0056211 A1‡ | 3/2018 | Seabrook | B04C 9/00 |
| 2018/0087364 A1‡ | 3/2018 | Krish | F04F 13/00 |
| 2018/0094648 A1‡ | 4/2018 | Hoffman | B01D 21/283 |
| 2018/0120197 A1‡ | 5/2018 | Di Monte | F16K 24/06 |
| 2018/0195370 A1‡ | 7/2018 | Theodossiou | E21B 43/267 |
| 2018/0209254 A1‡ | 7/2018 | Ghasripoor | E21B 43/267 |
| 2018/0252239 A1‡ | 9/2018 | Martin | E21B 43/26 |
| 2018/0306672 A1‡ | 10/2018 | Pattom | F04D 13/043 |
| 2018/0328517 A1‡ | 11/2018 | Zhou | F16K 3/267 |
| 2018/0347601 A1‡ | 12/2018 | Hoffman | F04B 53/18 |
| 2019/0071340 A1‡ | 3/2019 | Imrie | C02F 11/12 |
| 2020/0149362 A1‡ | 5/2020 | Terwilliger et al. | E21B 21/10 |
| 2020/0149380 A1‡ | 5/2020 | Procita | E21B 43/2607 |
| 2020/0149556 A1‡ | 5/2020 | Judge | F04F 13/00 |
| 2020/0149557 A1‡ | 5/2020 | Le Doux, Jr. | F16K 31/084 |
| 2020/0149657 A1‡ | 5/2020 | Christian | B08B 9/00 |

FOREIGN PATENT DOCUMENTS

| | | | | |
|---|---|---|---|---|
| CN | 206158951 U | ‡ | 5/2017 | |
| EP | 0163897 B1 | ‡ | 7/1988 | A61M 27/006 |
| EP | 1486706 A1 | ‡ | 12/2004 | F16K 3/24 |
| EP | 3177429 A1 | ‡ | 6/2017 | F16J 1/24 |
| GB | 0946494 A | ‡ | 1/1964 | |
| JP | 6386657 B2 | ‡ | 9/2018 | F04F 13/00 |
| NZ | 503937 A | ‡ | 6/2002 | |
| SG | 151056 A1 | ‡ | 5/2009 | |
| WO | WO-02/66816 A1 | ‡ | 8/2002 | |
| WO | WO-2010/031162 A9 | ‡ | 11/2010 | F03B 17/005 |
| WO | WO-2016/022706 A1 | ‡ | 2/2016 | B22F 7/02 |
| WO | WO-2016/063194 A3 | ‡ | 7/2016 | F02M 26/66 |
| WO | WO-2017/083500 A1 | ‡ | 5/2017 | F04B 15/02 |
| WO | WO 2017/193116 A1 | ‡ | 11/2017 | F04F 13/00 |
| WO | WO-2018/035201 A1 | ‡ | 2/2018 | F01L 1/022 |
| WO | WO-2018/085740 A2 | ‡ | 5/2018 | F04F 13/00 |

OTHER PUBLICATIONS

PCT International Patent Application No. PCT/US2019/060603, International Search Report dated Mar. 12, 2020, 2 pp.‡

Vorteq Pure Grit, This changes everything, Brochure, Energy Recovery Inc, 8 pages.‡

\* cited by examiner
‡ imported from a related application

FLUID EXCHANGE DEVICES AND RELATED SYSTEMS, AND METHODS

CROSS-REFERENCE TO RELATED APPLICATION

This application is a continuation of U.S. patent application Ser. No. 16/678,954, filed Nov. 8, 2019, for "Fluid Exchange Devices and Related Systems, and Methods," which application claims the benefit under 35 U.S.C. § 119(e) of U.S. Provisional Patent Application Ser. No. 62/758,359, filed Nov. 9, 2018, for "Fluid Exchange Devices and Related Systems, and Methods," the disclosure of each of which is hereby incorporated herein in its entirety by this reference.

TECHNICAL FIELD

The present disclosure relates generally to exchange devices. More particularly, embodiments of the present disclosure relate to fluid exchange devices for one or more of exchanging properties (e.g., pressure) between fluids and systems and methods.

BACKGROUND

Industrial processes often involve hydraulic systems including pumps, valves, impellers, etc. Pumps, valves, and impellers may be used to control the flow of the fluids used in the hydraulic processes. For example, some pumps may be used to increase (e.g., boost) the pressure in the hydraulic system, other pumps may be used to move the fluids from one location to another. Some hydraulic systems include valves to control where a fluid flows. Valves may include control valves, ball valves, gate valves, globe valves, check valves, isolation valves, combinations thereof, etc.

Some industrial processes involve the use of caustic fluids, abrasive fluids, and/or acidic fluids. These types of fluids may increase the amount of wear on the components of a hydraulic system. The increased wear may result in increased maintenance and repair costs or require the early replacement of equipment. For example, abrasive, caustic, or acidic fluid may increase the wear on the internal components of a pump such as an impeller, shaft, vanes, nozzles, etc. Some pumps are rebuildable and an operation may choose to rebuild a worn pump replacing the worn parts which may result in extended periods of downtime for the worn pump resulting in either the need for redundant pumps or a drop in productivity. Other operations may replace worn pumps at a larger expense but a reduced amount of downtime.

Well completion operations in the oil and gas industry often involve hydraulic fracturing (often referred to as fracking or fracing) to increase the release of oil and gas in rock formations. Hydraulic fracturing involves pumping a fluid (e.g., frac fluid, fracking fluid, etc.) containing a combination of water, chemicals, and proppant (e.g., sand, ceramics) into a well at high pressures. The high pressures of the fluid increases crack size and crack propagation through the rock formation releasing more oil and gas, while the proppant prevents the cracks from closing once the fluid is depressurized. Fracturing operations use high-pressure pumps to increase the pressure of the fracking fluid. However, the proppant in the fracking fluid increases wear and maintenance on and substantially reduces the operation lifespan of the high-pressure pumps due to its abrasive nature.

BRIEF SUMMARY

Various embodiments may include a device for exchanging pressure between at least two fluid streams. The device may include at least one high pressure inlet, at least one low pressure inlet, at least one high pressure outlet, and at least one low pressure outlet. The at least one high pressure inlet may be configured for receiving a fluid at a first higher pressure. The at least one low pressure inlet may be configured for receiving a downhole fluid (e.g., fracking fluid, drilling fluid) at a first lower pressure. The at least one high pressure outlet may be configured for outputting the downhole fluid at a second higher pressure that is greater than the first lower pressure. The at least one low pressure outlet may be configured for outputting the fluid at a second lower pressure that is less than the first higher pressure. The device may include a valve device. The valve device may include a valve actuator configured to move at variable rates in order selectively fill and empty at least one tank in communication with the at least one low pressure outlet and the at least one high pressure inlet. The valve actuator may also be configured to selectively place the fluid at the first higher pressure in communication with the downhole fluid at the first lower pressure in order to pressurize the downhole fluid to the second higher pressure; and selectively output the fluid at the second lower pressure from the pressure exchange device through the at least one low pressure outlet.

Another embodiment may include a device for exchanging pressure between at least two fluid streams. The device may include at least one high pressure inlet, at least one low pressure inlet, at least one high pressure outlet, at least one low pressure outlet, and at least one tank. The at least one high pressure inlet may be configured for receiving a fluid at a first higher pressure. The at least one low pressure inlet may be configured for receiving a downhole fluid at a first lower pressure. The at least one high pressure outlet may be configured for outputting the downhole fluid at a second higher pressure that is greater than the first lower pressure. The at least one low pressure outlet may be configured for outputting the fluid at a second lower pressure that is less than the first higher pressure. The at least one tank may be positioned between the at least one high pressure inlet and the at least one high pressure outlet. The device may also include a valve device including a valve actuator. The valve device may include staggered and overlapping openings positioned along a path of the actuator. The staggered and overlapping openings may be configured to selectively and gradually place the at least one high pressure inlet in communication with the at least one tank.

Another embodiment may include a method of operating a device for exchanging pressure between at least two fluid streams. The method may include receiving a fluid at a first higher pressure into a high pressure inlet of the device and receiving a downhole fluid at a lower pressure into the low pressure inlet of the device. The fluid at the first higher pressure may be placed in communication with the downhole fluid at the first lower pressure by moving an actuator of the device in order to pressurize the downhole fluid to a second higher pressure that is greater than the first lower pressure. The actuator of the device may be moved at a first speed as the valve member of the actuator approaches an opening between the high pressure inlet and the low pressure inlet. A velocity of the actuator of the device may be reduced from the first speed to a second speed as the valve member of the actuator traverses the opening.

Another embodiment may include a method of operating a device for exchanging pressure between at least two fluid streams. The method may include receiving a fluid at a first higher pressure into a high pressure inlet of the device and receiving a downhole fluid at a lower pressure into the low pressure inlet of the device. The fluid at the first higher pressure may be placed in communication with the downhole fluid at the first lower pressure by moving an actuator of the device in order to pressurize the downhole fluid to a second higher pressure that is greater than the first lower pressure. The method may further include moving the actuator of the device along staggered openings between the high pressure inlet and the low pressure inlet and intersecting only a minor portion of leading ends of the staggered openings at a time as the valve member of the actuator traverses the openings.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

Figure 1:
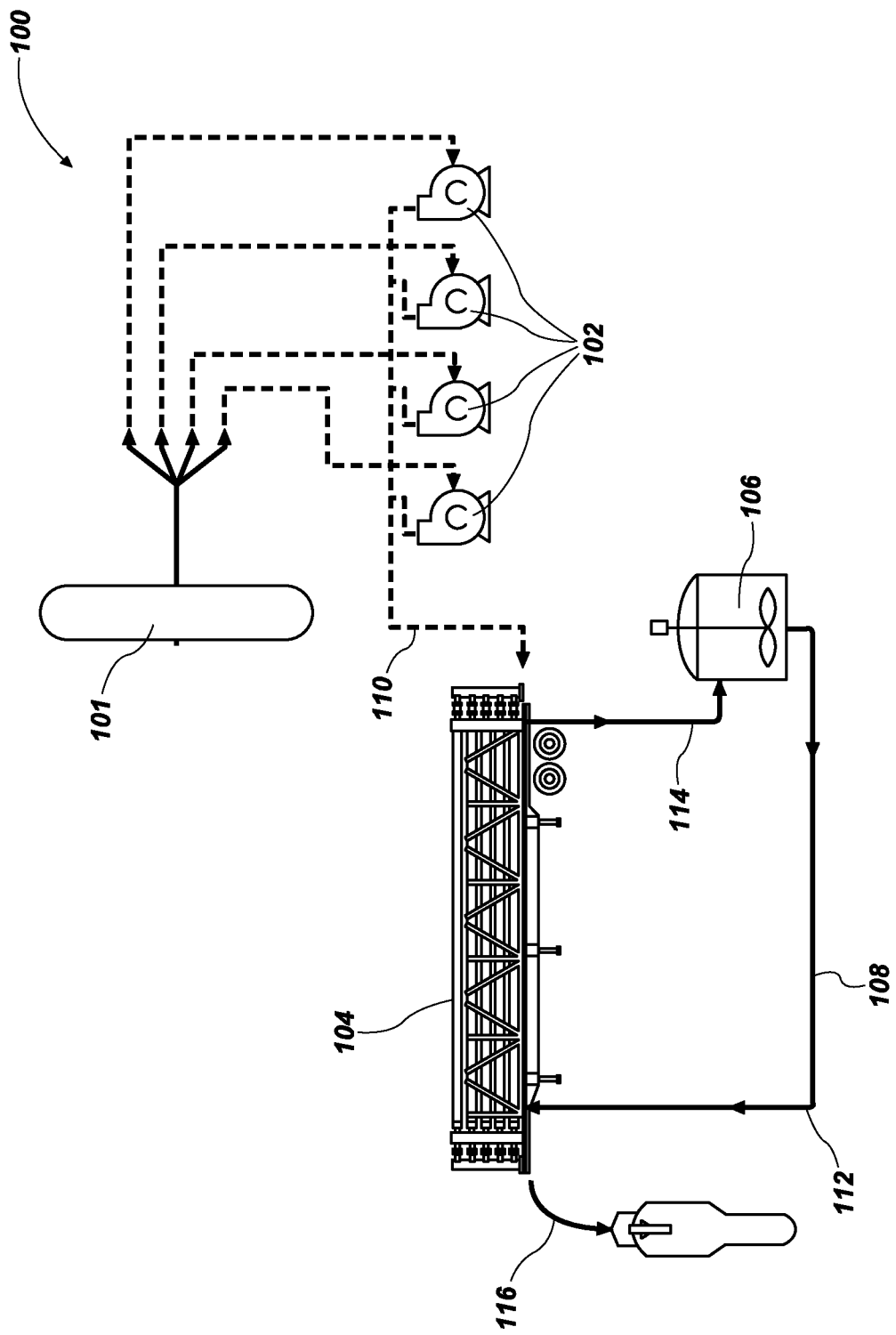
FIG. 1 is schematic view of a hydraulic fracturing system according to an embodiment of the present disclosure.

The illustrations presented herein are not meant to be actual views of any particular fluid exchanger or component thereof, but are merely idealized representations employed to describe illustrative embodiments. The drawings are not necessarily to scale. Elements common between figures may retain the same numerical designation.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the terms "vertical" and "lateral" refer to the orientations as depicted in the figures.

As used herein, the term "substantially" or "about" in reference to a given parameter means and includes a degree that one skilled in the art would understand that the given parameter, property, or condition is met with a small degree of variance, such as within acceptable manufacturing tolerances. For example, a parameter that is substantially met may be at least 90% met, at least 95% met, at least 99% met, or even 100% met.

As used herein, the term "fluid" may mean and include fluids of any type and composition. Fluids may take a liquid form, a gaseous form, or combinations thereof, and, in some instances, may include some solid material. In some embodiments, fluids may convert between a liquid form and a gaseous form during a cooling or heating process as described herein. In some embodiments, the term fluid includes gases, liquids, and/or pumpable mixtures of liquids and solids.

Embodiments of the present disclosure may relate to exchange devices that may be utilized to exchange one or more properties between fluids (e.g., a pressure exchanger). Such exchangers (e.g., pressure exchangers) are sometimes called "flow-work exchangers" or "isobaric devices" and are machines for exchanging pressure energy from a relatively high-pressure flowing fluid system to a relatively low-pressure flowing fluid system.

In some industrial processes, elevated pressures are required in certain parts of the operation to achieve the desired results, following which the pressurized fluid is depressurized. In other processes, some fluids used in the process are available at high-pressures and others at low-pressures, and it is desirable to exchange pressure energy between these two fluids. As a result, in some applications, great improvement in economy can be realized if pressure can be efficiently transferred between two fluids.

In some embodiments, exchangers as disclosed herein may be similar to and include the various components and configurations of the pressure exchangers disclosed in U.S. Pat. No. 5,797,429 to Shumway, issued Aug. 25, 1998, the disclosure of which is hereby incorporated herein in its entirety by this reference.

Although some embodiments of the present disclosure are depicted as being used and employed as a pressure exchanger between two or more fluids, persons of ordinary skill in the art will understand that the embodiments of the present disclosure may be employed in other implementations such as, for example, the exchange of other properties (e.g., temperature, density, etc.) and/or composition between one or more fluids and/or mixing of two or more fluids.

In some embodiments, a pressure exchanger may be used to protect moving components (e.g., pumps, valves, impellers, etc.) in processes were high pressures are needed in a fluid that has the potential to damage the moving components (e.g., abrasive fluid, caustic fluid, acidic fluid, etc.).

For example, pressure exchange devices according to embodiments of the disclosure may be implemented in hydrocarbon related processes, such as, hydraulic fracturing or other drilling operations (e.g., subterranean downhole drilling operations).

As discussed above, well completion operations in the oil and gas industry often involve hydraulic fracturing, drilling operations, or other downhole operations that use high-pressure pumps to increase the pressure of the downhole fluid (e.g., fluid that is intended to be conducted into a subterranean formation or borehole, such as, fracking fluid, drilling fluid, drilling mud). The proppants, chemicals, additives to produce mud, etc. in these fluids often increase wear and maintenance on the high-pressure pumps.

In some embodiments, a hydraulic fracturing system may include a hydraulic energy transfer system that transfers pressure between a first fluid (e.g., a clean fluid, such as a partially (e.g., majority) or substantially proppant free fluid or a pressure exchange fluid) and a second fluid (e.g., fracking fluid, such as a proppant-laden fluid, an abrasive fluid, or a dirty fluid). Such systems may at least partially (e.g., substantially, primarily, entirely) isolate the high-pressure first fluid from the second dirty fluid while still enabling the pressurizing of the second dirty fluid with the high-pressure first fluid and without having to pass the second dirty fluid directly through a pump or other pressurizing device.

While some embodiments discussed herein may be directed to fracking operations, in additional embodiments, the exchanger systems and devices disclosed herein may be utilized in other operations. For example, devices, systems, and/or method disclosed herein may be used in other downhole operations, such as, for example, downhole drilling operations.

FIG. 1 illustrates a system diagram of an embodiment of hydraulic fracturing system 100 utilizing a pressure exchanger between a first fluid stream (e.g., clean fluid stream) and a second fluid stream (e.g., a fracking fluid stream). Although not explicitly described, it should be understood that each component of the system 100 may be directly connected or coupled via a fluid conduit (e.g., pipe) to an adjacent (e.g., upstream or downstream) component. The hydraulic fracturing system 100 may include one or more devices for pressurizing the first fluid stream, such as, for example, fracking pumps 102 (e.g., reciprocating pumps, centrifugal pumps, scroll pumps, etc.). The hydraulic fracturing system 100 may include multiple fracking pumps 102, such as at least two fracking pumps 102, at least four fracking pumps 102, at least ten fracking pumps 102, at least sixteen frack pumps, or at least twenty fracking pumps 102. In some embodiments, the fracking pumps 102 may provide relatively and substantially clean fluid at a high pressure to a pressure exchanger 104 from a fluid source 101. In some embodiments, fluid may be provided separately to each fracking pump 102 (e.g., in a parallel configuration). After pressurization in the fracking pumps 102, the high pressure clean fluid 110 may be combined and transmitted to the pressure exchanger 104 (e.g., in a serial configuration).

As used herein, "clean" fluid may describe fluid that is at least partially or substantially free (e.g., substantially entirely or entirely free) of chemicals and/or proppants typically found in a fracking fluid and "dirty" fluid may describe fluid that at least partially contains chemicals and/or proppants typically found in a fracking fluid.

The pressure exchanger 104 may transmit the pressure from the high pressure clean fluid 110 to a low pressure fracking fluid (e.g., fracking fluid 112) in order to provide a high pressure fracking fluid 116. The clean fluid may be expelled from the pressure exchanger 104 as a low pressure fluid 114 after the pressure is transmitted to the low pressure fracking fluid 112. In some embodiments, the low pressure fluid 114 may be an at least partially or substantially clean fluid that substantially lacks chemicals and/or proppants aside from a small amount that may be passed to the low pressure fluid 114 from the fracking fluid 112 in the pressure exchanger 104.

In some embodiments, the pressure exchanger 104 may include one or more pressure exchanger devices (e.g., operating in parallel). In such configurations, the high pressure inputs may be separated and provided to inputs of each of the pressure exchanger devices. The outputs of each of the pressure exchanger devices may be combined as the high pressure fracking fluid exits the pressure exchanger 104. For example, and as discussed below with reference to FIG. 4, the pressure exchanger 104 may include two or more (e.g., three) pressure exchanger devices operating in parallel. As depicted, the pressure exchanger 104 may be provided on a mobile platform (e.g., a truck trailer) that may be relatively easily installed and removed from a fracking well site.

After being expelled from the pressure exchanger 104, the low pressure clean fluid 114 may travel to and be collected in a mixing chamber 106 (e.g., blender unit, mixing unit, etc.). In some embodiments, the low pressure fluid 114 may be converted (e.g., modified, transformed, etc.) to the low pressure fracking fluid 112 in the mixing chamber 106. For example, a proppant may be added to the low pressure clean fluid 114 in the mixing chamber 106 creating a low pressure fracking fluid 112. In some embodiments, the low pressure clean fluid 114 may be expelled as waste.

In many hydraulic fracturing operations, a separate process may be used to heat the fracking fluid 112 before the fracking fluid 112 is discharged downhole (e.g., to ensure proper blending of the proppants in the fracking fluid). In some embodiments, using the low pressure clean fluid 114 to produce the fracking fluid 112 may eliminate the step of heating the fracking fluid. For example, the low pressure clean fluid 114 may be at an already elevated temperature as a result of the fracking pumps 102 pressurizing the high pressure clean fluid 110. After transferring the pressure in the high pressure clean fluid 110 that has been heated by the pumps 102, the now low pressure clean fluid 114 retains at least some of that heat energy as it is passed out of the pressure exchanger 104 to the mixing chamber 106. In some embodiments, using the low pressure clean fluid 114 at an already elevated temperature to produce the fracking fluid may result in the elimination of the heating step for the fracking fluid. In other embodiments, the elevated temperature of the low pressure clean fluid 114 may result in a reduction of the amount of heating required for the fracking fluid.

After the proppant is added to the low pressure fluid 114, now fracking fluid, the low pressure fracking fluid 112 may be expelled from the mixing chamber 106. The low pressure fracking fluid 112 may then enter the pressure exchanger 104 on the fracking fluid end through a fluid conduit 108 connected (e.g., coupled) between the mixing chamber 106 and the pressure exchanger 104. Once in the pressure exchanger 104, the low pressure fracking fluid 112 may be pressurized by the transmission of pressure from the high pressure clean fluid 110 through the pressure exchanger 104. The high pressure fracking fluid 116 may then exit the pressure exchanger 104 and be transmitted downhole.

Hydraulic fracturing systems generally require high operating pressures for the high pressure fracking fluid 116. In some embodiments, the desired pressure for the high pressure fracking fluid 116 may be between about 8,000 PSI (55,158 kPa) and about 12,000 PSI (82,737 kPa), such as between about 9,000 PSI (62,052 kPa) and about 11,000 PSI (75,842 kPa), or about 10,000 PSI (68,947 kPa).

In some embodiments, the high pressure clean fluid 110 may be pressurized to a pressure at least substantially the same or slightly greater than the desired pressure for the high pressure fracking fluid 116. For example, the high pressure clean fluid 110 may be pressurized to between about 0 PSI (0 kPa) and about 1000 PSI (6,894 kPa) greater than the desired pressure for the high pressure fracking fluid 116, such as between about 200 PSI (1,379 kPa) and about 700 PSI (4,826 kPa) greater than the desired pressure, or between about 400 PSI (2,758 kPa) and about 600 PSI (4,137 kPa) greater than the desired pressure, to account for any pressure loss during the pressure and exchange process.

Figure 2:
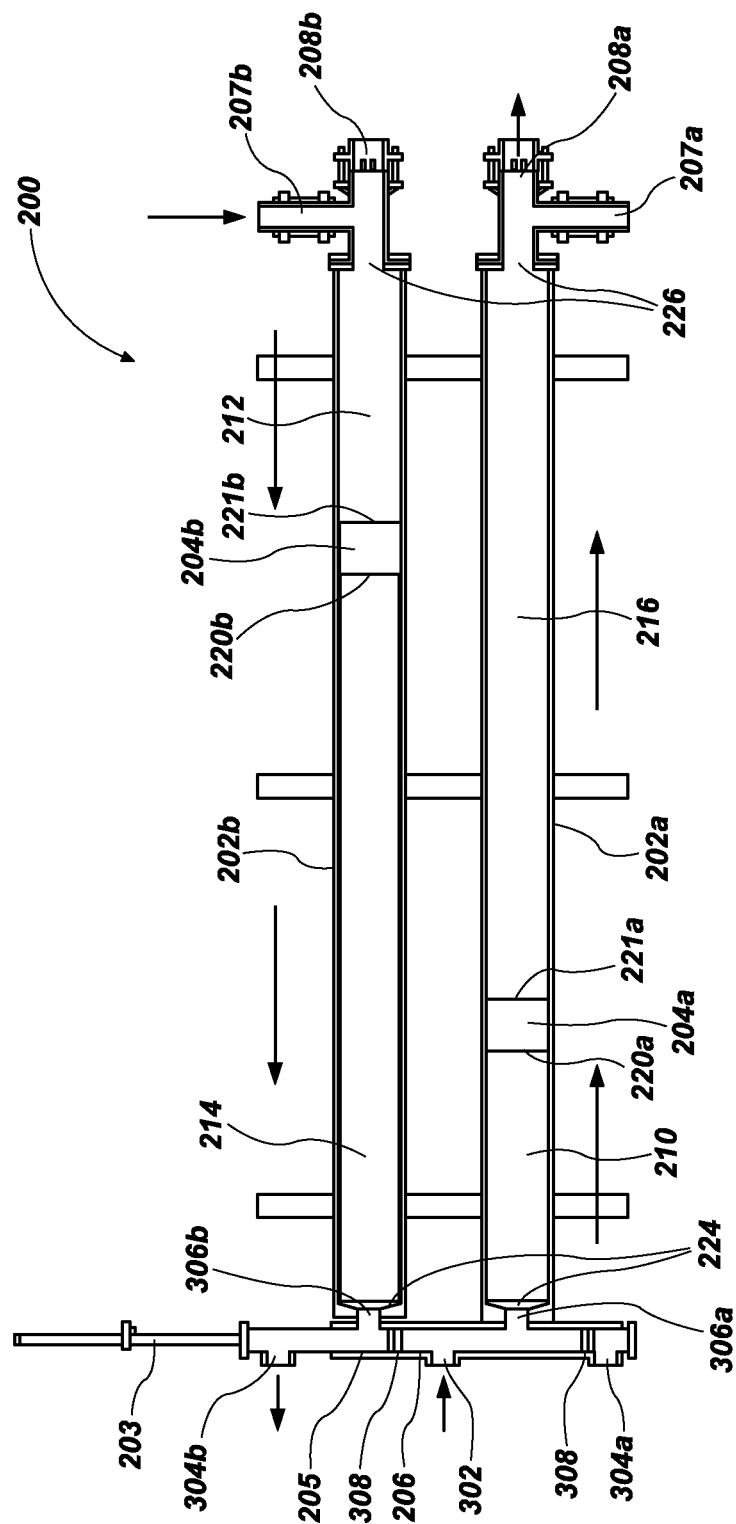
FIG. 2 is cross-sectional view of a fluid exchanger device according to an embodiment of the present disclosure.

FIG. 2 illustrates an embodiment of a pressure exchanger 200. The pressure exchanger 200 may be a linear pressure exchanger in the sense that it is operated by moving or translating an actuation assembly substantially along a linear path. For example, the actuation assembly may be moved linearly to selectively place the low and high pressure fluids in at least partial communication (e.g., indirect communication where the pressure of the high pressure fluid may be transferred to the low pressure fluid) as discussed below in greater detail.

The linear pressure exchanger 200 may include one or more (e.g., two) chambers 202a, 202b (e.g., tanks, collectors, cylinders, tubes, pipes, etc.). The chambers 202a, 202b (e.g., parallel chambers 202a, 202b) may include pistons 204a, 204b configured to substantially maintain the high pressure clean fluid 210 and low pressure clean fluid 214 (e.g., the clean side) separate from the high pressure dirty fluid 216 and the low pressure dirty fluid 212 (e.g., the dirty side) while enabling transfer of pressure between the respective fluids 210, 212, 214, and 216. The pistons 204a, 204b may be sized (e.g., the outer diameter of the pistons 204a, 204b relative to the inner diameter of the chambers 202a, 202b) to enable the pistons 204a, 204b to travel through the chamber 202a, 202b while minimizing fluid flow around the pistons 204a, 204b.

The linear pressure exchanger 200 may include a clean control valve 206 configured to control the flow of high pressure clean fluid 210 and low pressure clean fluid 214. Each of the chambers 202a, 202b may include one or more dirty control valves 207a, 207b, 208a, 208b configured to control the flow of the low pressure dirty fluid 212 and the high pressure dirty fluid 216.

While the embodiment of FIG. 2 contemplates a linear pressure exchanger 200, other embodiments, may include other types of pressure exchangers that involve other mechanisms for selectively placing the low and high pressure fluids in at least partial communication (e.g., a rotary actuator such as those disclosed in U.S. Pat. No. 9,435,354, issued Sep. 6, 2016, the disclosure of which is hereby incorporated herein in its entirety by this reference, etc.).

In some embodiments, the clean control valve 206, which includes an actuation stem 203 that moves one or more stoppers 308 along (e.g., linearly along) a body 205 of the valve 206, may selectively allow (e.g., input, place, etc.) high pressure clean fluid 210 provided from a high pressure inlet port 302 to enter a first chamber 202a on a clean side 220a of the piston 204a. The high pressure clean fluid 210 may act on the piston 204a moving the piston 204a in a direction toward the dirty side 221a of the piston 204a and compressing the dirty fluid in the first chamber 202a to produce the high pressure dirty fluid 216. The high pressure dirty fluid 216 may exit the first chamber 202a through the dirty discharge control valve 208a (e.g., outlet valve, high pressure outlet). At substantially the same time, the low pressure dirty fluid 212 may be entering the second chamber 202b through the dirty fill control valve 207b (e.g., inlet valve, low pressure inlet). The low pressure dirty fluid 212 may act on the dirty side 221b of the piston 204b moving the piston 204b in a direction toward the clean side 220b of the piston 204b in the second chamber 202b. The low pressure clean fluid 214 may be discharged (e.g., emptied, expelled, etc.) through the clean control valve 206 as the piston 204b moves in a direction toward the clean side 220b of the piston 204b reducing the space on the clean side 220b of the piston 204b within the second chamber 202b. A cycle of the pressure exchanger is completed once each piston 204a, 204b moves the substantial length (e.g., the majority of the length) of the respective chamber 202a, 202b (which "cycle" may be a half cycle with the piston 204a, 204b moving in one direction along the length of the chamber 202a, 202b and a full cycle includes the piston 204a, 204b moving in the one direction along the length of the chamber 202a, 202b and then moving in the other direction to return to substantially the original position). In some embodiments, only a portion of the length may be utilized (e.g., in reduced capacity situations). Upon the completion of a cycle, the actuation stem 203 of the clean control valve 206 may change positions enabling the high pressure clean fluid 210 to enter the second chamber 202b, thereby changing the second chamber 202b to a high pressure chamber and changing the first chamber 202a to a low pressure chamber and repeating the process.

In some embodiments, each chamber 202a, 202b may have a higher pressure on one side of the pistons 204a, 204b to move the piston in a direction away from the higher pressure. For example, the high pressure chamber may experience pressures between about 8,000 PSI (55,158 kPa) and about 13,000 PSI (89,632 kPa) with the highest pressures being in the high pressure clean fluid 210 to move the piston 204a, 204b away from the high pressure clean fluid 210 compressing and discharging the dirty fluid to produce the high pressure dirty fluid 216. The low pressure chamber 202a, 202b may experience much lower pressures, relatively, with the relatively higher pressures in the currently low pressure chamber 202a, 202b still being adequate enough in the low pressure dirty fluid 212 to move the piston 204a, 204b in a direction away from the low pressure dirty fluid 212 discharging the low pressure clean fluid 214. In some embodiments, the pressure of the low pressure dirty fluid 212 may be between about 100 PSI (689 kPa) and about 700 PSI (4,826 kPa), such as between about 200 PSI (1,379 kPa) and about 500 PSI (3,447 kPa), or between about 300 PSI (2,068 kPa) and about 400 PSI (2758 kPa).

Referring back to FIG. 1, in some embodiments, the system 100 may include an optional device (e.g., a pump) to pressurize the low pressure dirty fluid 212 (e.g., to a pressure level that is suitable to move the piston 204a, 204b toward the clean side) as it is being provided into the chambers 202a, 202b.

Referring again to FIG. 2, if any fluid pushes past the piston 204a, 204b (e.g., leak by, blow by, etc.) it will generally tend to flow from the higher pressure fluid to the lower pressure fluid. The high pressure clean fluid 210 may be maintained at the highest pressure in the system such that the high pressure clean fluid 210 may not generally become substantially contaminated. The low pressure clean fluid 214 may be maintained at the lowest pressure in the system. Therefore, it is possible that the low pressure clean fluid 214 may become contaminated by the low pressure dirty fluid 212. In some embodiments, the low pressure clean fluid 214 may be used to produce the low pressure dirty fluid 212 substantially nullifying any detriment resulting from the contamination. Likewise, any contamination of the high pressure dirty fluid 216 by the high pressure clean fluid 210 would have minimal effect on the high pressure dirty fluid 216.

In some embodiments, the dirty control valves 207a, 207b, 208a, 208b may be check valves (e.g., clack valves, non-return valves, reflux valves, retention valves, or one-way valves). For example, one or more of the dirty control valves 207a, 207b, 208a, 208b may be a ball check valve, diaphragm check valve, swing check valve, tilting disc check valve, clapper valve, stop-check valve, lift-check valve, in-line check valve, duckbill valve, etc. In additional embodiments, one or more of the dirty control valves 207a, 207b, 208a, 208b may be actuated valves (e.g., solenoid valves, pneumatic valves, hydraulic valves, electronic valves, etc.) configured to receive a signal from a controller and open or close responsive the signal.

The dirty control valves 207a, 207b, 208a, 208b may be arranged in opposing configurations such that when the chamber 202a, 202b is in the high pressure configuration the high pressure dirty fluid opens the dirty discharge control valve 208a, 208b while the pressure in the chamber 202a, 202b holds the dirty fill control valve 207a, 207b closed. For example, the dirty discharge control valve 208a, 208b comprises a check valve that opens in a first direction out of the chamber 202a, 202b, while the dirty fill control valve 207a, 207b comprises a check valve that opens in a second, opposing direction into the chamber 202a, 202b.

The dirty discharge control valves 208a, 208b may be connected to a downstream element (e.g., a fluid conduit, a separate or common manifold) such that the high pressure in the downstream element holds the dirty discharge valve 208a, 208b closed in the chamber 202a, 202b that is in the low pressure configuration. Such a configuration enables the low pressure dirty fluid to open the dirty fill control valve 207a, 207b and enter the chamber 202a, 202b.

Figure 3A:
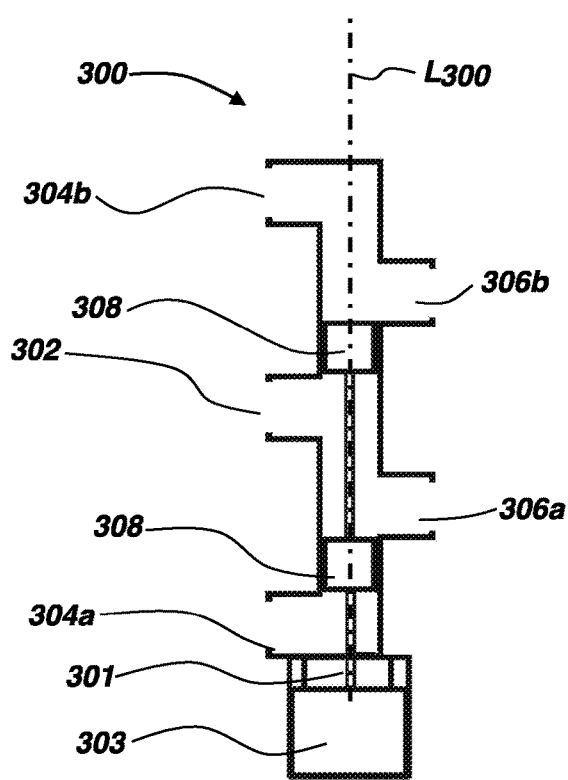
FIG. 3A is a cross-sectional view of a control valve in a first position according to an embodiment of the present disclosure.
Figure 3B:
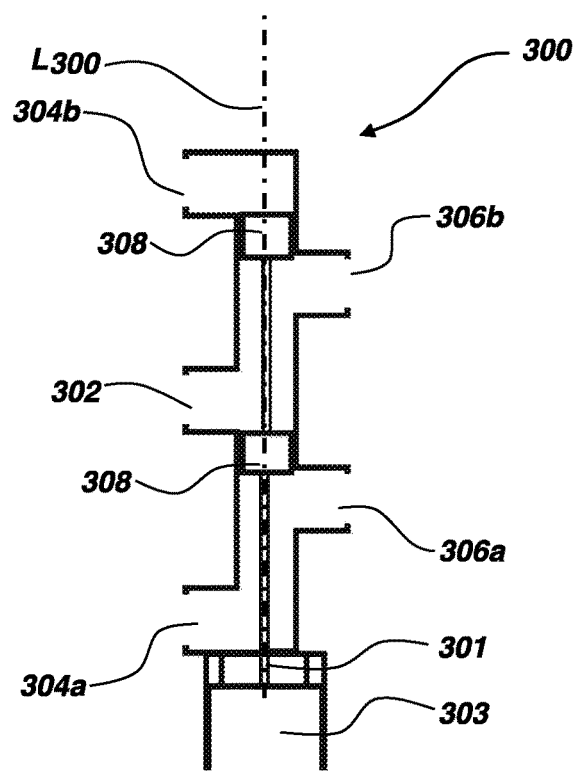
FIG. 3B is a cross-sectional view of a control valve in a second position according to an embodiment of the present disclosure.

FIGS. 3A and 3B illustrate a cross sectional view of an embodiment of a clean control valve 300 at two different positions. In some embodiments, the clean control valve 300 may be similar to the control valve 206 discussed above. The clean control valve 300 may be a multiport valve (e.g., 4 way valve, 5 way valve, LinX® valve, etc.). The clean control valve 300 may have one or more high pressure inlet ports (e.g., one port 302), one or more low pressure outlet ports (e.g., two ports 304a, 304b), and one or more chamber connection ports (e.g., two ports 306a, 306b). The clean control valve 300 may include at least two stoppers 308 (e.g., plugs, pistons, discs, valve members, etc.). In some embodiments, the clean control valve 300 may be a linearly actuated valve. For example, the stoppers 308 may be linearly actuated such that the stoppers 308 move along a substantially straight line (e.g., along a longitudinal axis L300 of the clean control valve 300).

The clean control valve 300 may include an actuator 303 configured to actuate the clean control valve 300 (e.g., an actuator coupled to a valve stem 301 of the clean control valve 300). In some embodiments, the actuator 303 may be electronic (e.g., solenoid, rack and pinion, ball screw, segmented spindle, moving coil, etc.), pneumatic (e.g., tie rod cylinders, diaphragm actuators, etc.), or hydraulic. In some embodiments, the actuator 303 may enable the clean control valve 300 to move the valve stem 301 and stoppers 308 at variable rates (e.g., changing speeds, adjustable speeds, etc.).

FIG. 3A illustrates the clean control valve 300 in a first position. In the first position, the stoppers 308 may be positioned such that the high pressure clean fluid may enter the clean control valve 300 through the high pressure inlet port 302 and exit into a first chamber through the chamber connection port 306a. In the first position, the low pressure clean fluid may travel through the clean control valve 300 between the chamber connection port 306b and the low pressure outlet port 304b (e.g., may exit through the low pressure outlet port 304b).

FIG. 3B illustrates the clean control valve 300 in a second position. In the second position, the stoppers 308 may be positioned such that the high pressure clean fluid may enter the clean control valve 300 through the high pressure inlet port 302 and exit into a second chamber through the chamber connection port 306b. The low pressure clean fluid may travel through the clean control valve 300 between the chamber connection port 306a and the low pressure outlet port 304a (e.g., may exit through the low pressure outlet port 304a).

Now referring to FIGS. 2, 3A, and 3B, the clean control valve 206 is illustrated in the first position with the high pressure inlet port 302 connected to the chamber connection port 306a providing high pressure clean fluid to the first chamber 202a. Upon completion of the cycle, the clean control valve 206 may move the stoppers 308 to the second position thereby connecting the high pressure inlet port 302 to the second chamber 202b through the chamber connection port 306b.

In some embodiments, the clean control valve 206 may pass through a substantially fully closed position in the middle portion of a stroke between the first position and the second position. For example, in the first position, the stoppers 308 may maintain a fluid pathway between the high pressure inlet port 302 and the chamber connection port 306a and a fluid pathway between the chamber connection port 306b and the low pressure outlet port 304b. In the second position, the stoppers 308 may maintain a fluid pathway between the high pressure inlet port 302 and the chamber connection port 306b and a fluid pathway between the chamber connection port 306a and the low pressure outlet port 304a. Transitioning between the first and second positions may involve at least substantially closing both fluid pathways to change the connection of the chamber connection port 306a from the high pressure inlet port 302 to the low pressure outlet port 304a and to change the connection of the chamber connection port 306b from the low pressure outlet port 304b to the high pressure inlet port 302. The fluid pathways may at least substantially close at a middle portion of the stroke to enable the change of connections.

Opening and closing valves where fluids are operating at high pressures may result in pressure pulsations (e.g., water hammer) that can result in damage to components in the system when high pressure is suddenly introduced or removed from the system. As a result, pressure pulsations may occur in the middle portion of the stroke when the fluid pathways are closing and opening respectively.

In some embodiments, the actuator 303 may be configured to move the stoppers 308 at variable speeds along the stroke of the clean control valve 206. As the stoppers 308 move from the first position to the second position, the stoppers 308 may move at a high rate of speed while traversing a first portion of the stroke that does not involve newly introducing flow from the high pressure inlet port 302 into the chamber connection ports 306a, 306b. The stoppers 308 may decelerate to a low rate of speed as the stoppers 308 approach a closed position (e.g., when the stoppers 308 block the chamber connection ports 306a, 306b during the transition between the high pressure inlet port 302 connection and the low pressure outlet port 304a, 304b connection) at a middle portion of the stroke. The stoppers 308 may continue at a lower rate of speed, as the high pressure inlet port 302 is placed into communication with one of the chamber connection ports 306a, 306b. After, traversing the chamber connection ports 306a, 306b, the stoppers 308 may accelerate to another high rate of speed as the stoppers 308 approach the second position. The low rate of speed in the middle portion of the stroke may reduce the speed that the clean control valve 206 opens and closes enabling the clean control valve to gradually introduce and/or remove the high pressure from the chambers 202a, 202b.

In some embodiments, the motion of the pistons 204a, 204b may be controlled by regulating the rate of fluid flow (e.g., of the incoming fluid) and/or a pressure differential between the clean side 220a, 220b of the pistons 204a, 204b, and the dirty side 221a, 221b of the pistons 204a, 204b at least partially with the movement of the clean control valve 206. In some embodiments, it may be desirable for the piston 204a, 204b in the low pressure chamber 202a, 202b to move at substantially the same speed as the piston 204a, 204b in the high pressure chamber 202a, 202b either by manipulating their pressure differentials in each chamber and/or by controlling the flow rates of the fluid in and out of the chambers 202a, 202b. However, the piston 204a, 204b in the low pressure chamber 202a, 202b may tend to move at a greater speed than the piston 204a, 204b in the high pressure chamber 202a, 202b.

In some embodiments, the rate of fluid flow and/or the pressure differential may be varied to control acceleration and deceleration of the pistons 204a, 204b (e.g., by manipulating and/or varying the stroke of the clean control valve 206 and/or by manipulating the pressure in the fluid streams with one or more pumps). For example, increasing the flow rate and/or the pressure of the high pressure clean fluid 210 when the piston 204a, 204b is near a clean end 224 of the chamber 202a, 202b at the beginning of the high pressure stroke may increase the rate of fluid flow and/or the pressure differential in the chamber 202a, 202b. Increasing the rate of fluid flow and/or the pressure differential may cause the piston 204a, 204b to accelerate to or move at a faster rate. In another example, the flow rate and/or the pressure of the high pressure clean fluid 210 may be decreased when the piston 204a, 204b approaches a dirty end 226 of the chamber 202a, 202b at the end of the high pressure stroke. Decreasing the rate of fluid flow and/or the pressure differential may cause the piston 204a, 204b to decelerate and/or stop before reaching the dirty end of the respective chamber 202a, 202b.

Similar control with the stroke of the clean control valve 206 may be utilized to prevent the piston 204a, 204b from traveling to the furthest extent of the clean end of the chambers 202a, 202b. For example, the clean control valve 206 may close off one of the chamber connection ports 306a, 306b before the piston 204a, 204b contacts the furthest extent of the clean end of the chambers 202a, 202b by preventing any further fluid flow and slowing and/or stopping the piston 204a, 204b. In some embodiments, the clean control valve 206 may open one the chamber connection ports 306a, 306b into communication with the high pressure inlet port 302 before the piston 204a, 204b contacts the furthest extent of the clean end of the chambers 202a, 202b in order to slow, stop, and/or reverse the motion of the piston 204a, 204b.

If the pistons 204a, 204b reach the clean end 224 or dirty end 226 of the respective chambers 202a, 202b the higher pressure fluid may bypass the piston 204a, 204b and mix with the lower pressure fluid. In some embodiments, mixing the fluids may be desirable. For example, if the pistons 204a, 204b reach the dirty end 226 of the respective chambers 202a, 202b during the high pressure stroke, the high pressure clean fluid 210 may bypass the piston 204a, 204b (e.g., by traveling around the piston 204a, 204b or through a valve in the piston 204a, 204b) flushing any residual contaminants from the surfaces of the piston 204a, 204b. In some embodiments, mixing the fluids may be undesirable. For example, if the pistons 204a, 204b reach the clean end 224 of the respective chambers 202a, 202b during the low pressure stroke, the low pressure dirty fluid 212 may bypass the piston 204a, 204b and mix with the low pressure clean fluid contaminating the clean area in the clean control valve 206 with the dirty fluid.

In some embodiments, the system 100 may prevent the pistons 204a, 204b from reaching the clean end 224 of the respective chambers 202a, 202b. For example, the clean control valve 206 may include a control device (e.g., sensor, safety, switch, etc.) to trigger the change in position of the clean control valve 206 on detecting the approach of the piston 204a, 204b to the clean end 224 of the respective chamber 202a, 202b such that the system 100 may utilize the clean control valve 206 to change flow path positions before the piston 204a, 204b reaches the clean end 224 of the chamber 202a, 202b.

In some embodiments, pressure spikes may occur in the fluids. For example, pressure spikes may occur in the high pressure clean fluid 210 when the clean control valve 206 closes or opens. In some embodiments, the chambers 202a, 202b and pistons 204a, 204b may dampen (e.g., reduce, balance, etc.) any pressure spikes in the high pressure clean fluid 210 when transferring pressure from the high pressure clean fluid 210 to the dirty fluid 212 producing the high pressure dirty fluid 216 while minimizing pressure spikes.

In some embodiments, duration of each cycle may correlate to the production of the system 100. For example, in each cycle the pressure exchanger 200 may move a specific amount of dirty fluid defined by the combined capacity of the chambers 202a, 202b. In some embodiments, the pressure exchanger 200 may move between about 40 gallons (75.7 liters) and about 90 gallons (340.7 liters), such as between about 60 gallons (227.1 liters) and about 80 gallons (302.8 liters), or between about 65 gallons (246.1 liters) and about 75 gallons (283.9 liters). For example, in a system with one or more tanks (e.g., two tanks), each tank in the pressure exchanger 200 may move between about 40 gallons (75.7 liters) and about 90 gallons (340.7 liters) (e.g., two about 60 gallon (227.1 liters) tanks that move about 120 gallons (454.2 liters) per cycle).

In some embodiments, the duration of the cycles may be controlled by varying the rate of fluid flow and/or pressure differential across the pistons 204a, 204b with the clean control valve 206. For example, the flow rate and/or pressure of the high pressure clean fluid 210 may be controlled such that the cycles correspond to a desired flow rate of the dirty fluid 212. In some embodiments, the flow rate and/or the pressure may be controlled by controlling a speed of the frac pumps 102 (FIG. 1) (e.g., through a variable frequency drive (VFD), throttle control, etc.), through a mechanical pressure control (e.g., variable vanes, pressure relief system, bleed valve, etc.), or by changing the position of the clean control valve 206 to restrict flow into or out of the chambers 202a, 202b.

In some embodiments, maximum production may be the desired condition which may use the shortest possible duration of the cycle. In some embodiments, the shortest duration of the cycle may be defined by the speed of the actuator 303 on the clean control valve 206, 300. In some embodiments, the shortest duration of the cycle may be defined by the maximum pressure of the high pressure clean fluid 210. In some embodiments, the shortest duration may be defined by the response time of the clean control valve 206, 300.

In some embodiments, a pressure difference between the high pressure clean fluid 210 and the low pressure clean fluid 214 may require small incremental movement as the clean control valve 206 opens and closes. For example, if the pressure difference between the high pressure clean fluid 210 and the low pressure clean fluid 214 is high even a small opening could allow for large pressure pulsations and/or fast pressure increases on the low pressure side of the clean control valve 206. For accurate pressure control across a valve, the valve may utilize flow restriction to maintain a pressure differential across the valve. Systems with high pressure differences may make it difficult to create enough flow restriction to control the pressure in the chambers 202a, 202b with the clean control valve 206.

Figure 4:
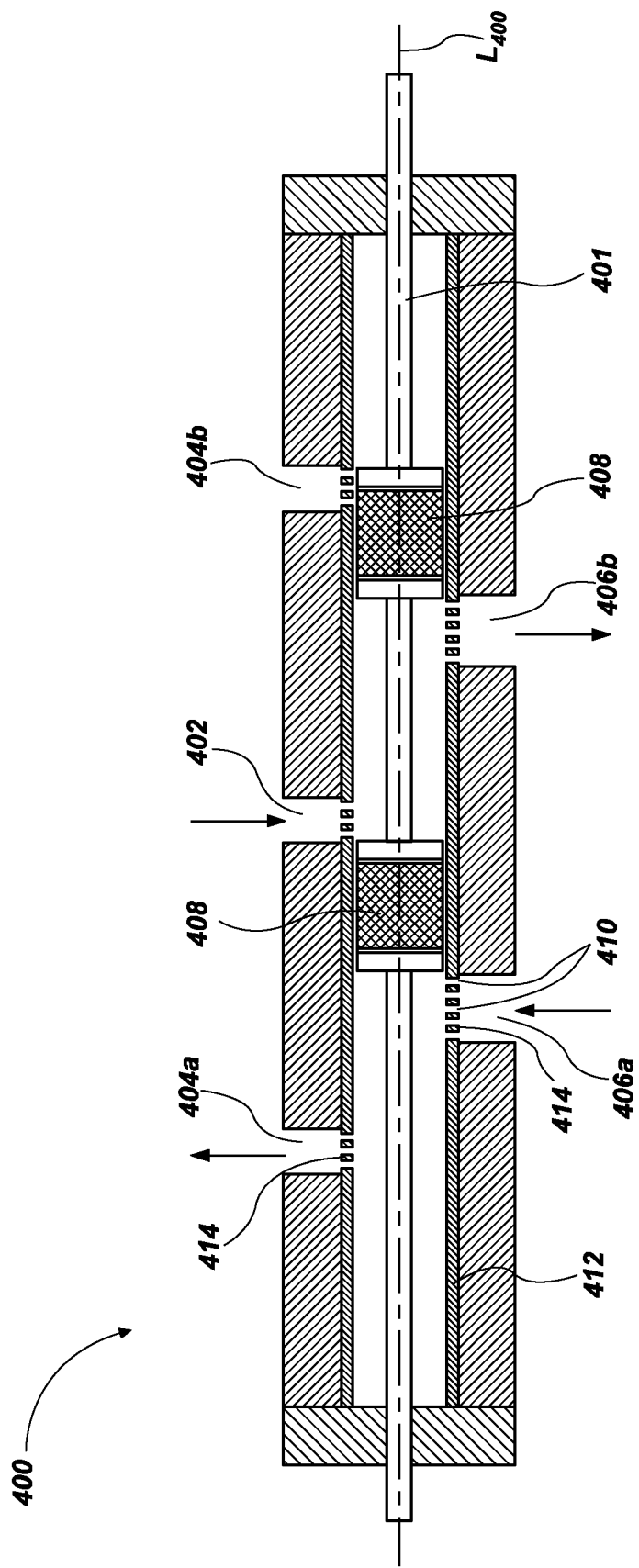
FIG. 4 is a cross-sectional view of a control valve according to an embodiment of the present disclosure.

FIG. 4 illustrates a cross-sectional view of an embodiment of a clean control valve 400. In some embodiments, the clean control valve 400 may be similar to the control valves 206 and 300 discussed above. The clean control valve 400 may have one or more inlet ports (e.g., high pressure inlet ports 402), one or more outlet ports (e.g., low pressure outlet ports 404a, 404b), and one or more outlet and/or inlet ports (e.g., chamber connection ports 406a, 406b). The clean control valve 400 may include one or more stoppers 408 on a valve stem 401. In some embodiments, the clean control valve 400 may be a linearly actuated valve. For example, the stoppers 408 may be linearly actuated such that the stoppers 408 move along a substantially straight line (e.g., with the valve stem 401 along a longitudinal axis L400 of the clean control valve 400). In some embodiments, the clean control valve 400 may be cylindrical (e.g., with a substantially circular cross-section, with an annular shaped cross-section, etc.) or may be another cross-sectional shape (e.g. a polygonal shape, rectangular shape, etc.).

In some embodiments, at least one of the low pressure outlet ports 404a, 404b, the high pressure inlet ports 402, and the chamber connection ports 406a, 406b may include one or more openings 410. For example, the chamber connection ports 406a, 406b may include at least three openings 410 or at least four openings 410 and/or the low pressure outlet ports 404a, 404b may include at least three openings 410 or at least four openings 410. In some embodiments, the openings 410 may be defined by a valve body liner 412 (e.g., a housing, a sleeve, which may be replaceable). In some embodiments, the body liner 412 may comprise a metal material (e.g., stainless steel, a polymer material, or combinations thereof). The valve body liner 412 may include opening walls 414 that may define the openings 410. In some embodiments, the openings 410 may be defined such that a larger (e.g., major) dimension of the openings 410 is perpendicular to the longitudinal axis L400 of the clean control valve 400 and the path of the stoppers 408. For example, a major dimension of the openings 410 extends along a lateral dimension (e.g., along a circumference) of the control valve 400. In additional embodiments, a major dimension of the openings 410 extends along the longitudinal axis L400 of the clean control valve 400.

In some embodiments, the openings 410 may be defined in substantially uniform shapes such as, square or rectangular openings. However, substantially uniform shapes may result in an abrupt increase or decrease in open area when the stoppers 408 initially open or finish closing the ports. In some embodiments, the openings 410 may be defined in shapes of gradually increasing or decreasing area, for example, triangular shapes, elliptical shapes, oval shaped, circular shapes, parabolic shapes, polygonal shapes, etc.) such that as the stoppers 408 move across the openings 410, the area of the opening 410 that enables fluid flow may decrease or increase more gradually as compared to a substantially uniform opening.

In some embodiments, the openings 410 may be arranged such that, as the stoppers 408 move along the substantially straight line, each opening 410 is opened and/or closed individually at a different time (e.g., separately). For example, as the stoppers 408 move from a first position to a second position, the stoppers 408 may close (e.g., block, obstruct, etc.) a first opening 410 in each of the chamber connection ports 406a, 406b. The stoppers 408 may then close a second opening 410 in each of the chamber connection ports 406a, 406b. The stoppers 408 may then continue to close additional openings 410 in each of the chamber connection ports 406a until all of the openings 410 in each of the chamber connection ports 406a, 406b are closed. The stoppers 408 may continue to move along the substantially straight line opening the first opening 410 in each of the chamber connection ports 406a, 406b. The stoppers 408 may then open the second opening 410 in each of the chamber connection ports 406a, 406b. The stoppers 408 may then continue to open any additional openings 410 in each of the chamber connection ports in order until all of the openings 410 in each of the chamber connection ports is open.

Figure 5:
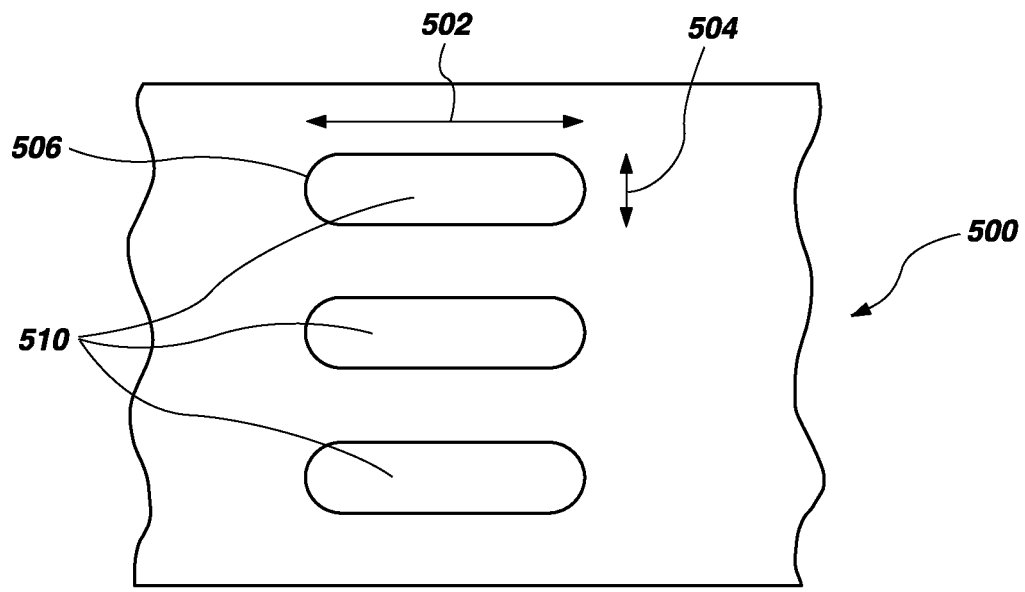
FIG. 5 is a view of a valve port according to an embodiment of the present disclosure.

FIG. 5 illustrates an embodiment of a port 500 of a valve device (e.g., clean control valve 206, 300 (FIGS. 2, 3A, and 3B)), with multiple openings 510. Referring to FIGS. 4 and 5, the openings 510 may have a long dimension 502 and a short dimension 504 (e.g., based on the total number of openings 510 and/or desired opening/pressure/flow characteristics). For example, the openings 510 (e.g., high pressure openings) may be 4.25 inches (10.795 cm) long and 0.50 inches (1.27 cm) wide and another set of openings 510 (e.g., low pressure openings) may be 3.00 inches (7.62 cm) long and 0.50 inches (1.27 cm) wide. The openings 510 may be arranged such that the long dimension 502 is substantially perpendicular to the path of the stoppers 408 (FIG. 4), such that the openings 510 and the port 500 operate similar to the low pressure outlet ports 404a, 404b and/or the chamber connection ports 406a, 406b as described above and illustrated in FIG. 4.

In some embodiments, the openings 510 may be arranged such that the long dimension 502 is substantially parallel with the path of the stoppers 408 and an end 506 of each opening 510 may be substantially aligned (e.g., axially aligned). For example, the stoppers 408 may begin to expose an area (e.g., a rounded end) of each opening 510 (e.g., intersect each opening) at substantially the same time as the stoppers 408 begin to move across the openings from a substantially closed (e.g., blocked, obstructed) position. The exposed area of the openings 510 may gradually increase as the stoppers 408 move across the openings 510.

In some embodiments, a speed of the stoppers 408 may be varied to provide a controlled increase in flow through the openings 510. For example, when there is a large pressure difference across the openings, the pressure may rapidly rise on the lower pressure side of the openings 510 when the openings 510 begin to open exposing a small area (e.g., cross-sectional area) of the opening 510. The speed of the actuator 303 (FIGS. 3A and 3B) may be varied to control a rate of the pressure increase on the low pressure side of the stoppers 408. For example, the stoppers 408 may move slowly when initially exposing the openings 510, thereby, restricting flow of a fluid through the openings 510 and reducing the rate of the pressure increase. As more of the area of the openings 510 is exposed, the stoppers 408 may move at a faster speed. The faster speed may be utilized to enable the pressures on either side of the openings 510 to equalize or may be implemented once the pressures on either side of the openings 510 have already been equalized.

When the stoppers 408 close the openings 510, the speed of the stoppers 408 may vary. For example, as the stoppers 408 begin reducing the exposed area of the openings 510, the stoppers may move at a higher rate of speed. As the exposed area of the openings 510 decreases to a small exposed area, the stoppers 408 may reduce speed to avoid abruptly interrupting a flow of the fluid through the openings 510.

Figure 6:
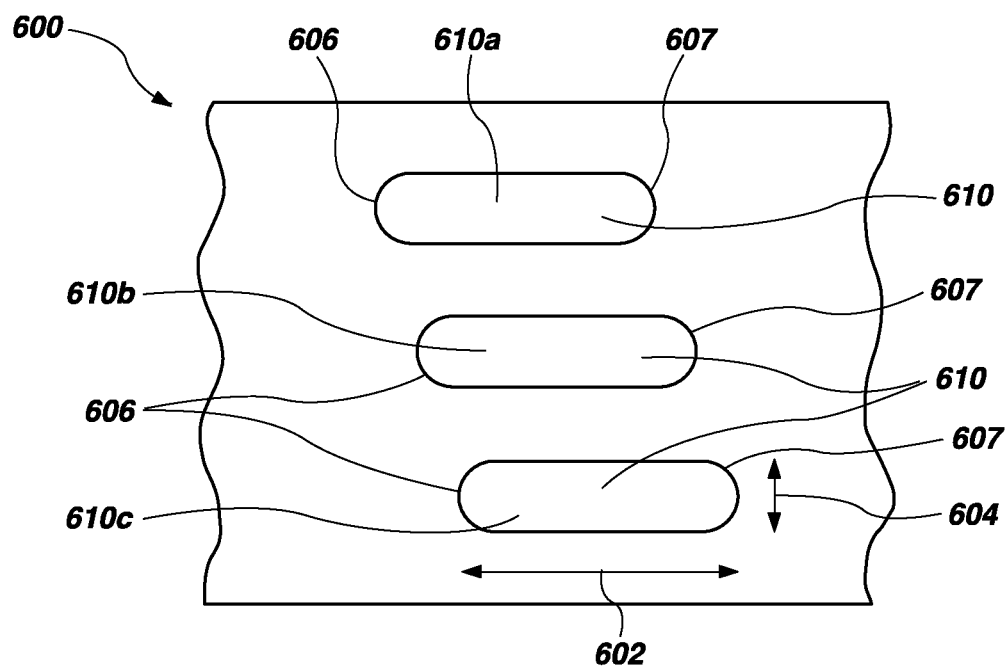
FIG. 6 is a view of a valve port according to an embodiment of the present disclosure.

FIG. 6 illustrates an embodiment of a port 600 of a valve device (e.g., clean control valve 206, 300 (FIGS. 2, 3A, and 3B)), with multiple openings 610, which may be similar to and utilized in the same or similar manner as the openings 410, 510 discussed herein with reference to FIGS. 4 and 5.

Referring to FIGS. 4 and 6, the openings 610 may have a long dimension 602 and a short dimension 604. The openings 610 may be arranged such that the long dimension 602 is substantially parallel with the path of the stoppers 408 and an end 606 (e.g., leading end) of each of the openings 610 is not substantially aligned with the end 606 of the other openings 610 (e.g., aligned along a direction transverse to the longitudinal axis L400 (FIG. 4). For example, a second opening 610b may be arranged adjacent (e.g., in a direction perpendicular to the long dimension 602 of the openings 610) a first opening 610a. As depicted, the second opening 610b may be offset in a direction of the path of the stoppers 408 (e.g., offset in a direction substantially parallel with the longitudinal axis L400 of the clean control valve 400 (FIG. 4), or axially offset) such that when the stoppers 408 begin to move across the openings from a substantially closed position, the stoppers 408 may begin to expose an area of the first opening 610a while the area of the second opening 610b remains closed (e.g., blocked by the stoppers 408).

In some embodiments, the offset between the first opening 610a and the second opening 610b may less than about 50% of the long dimension 602 of the openings, such as between about 5% or 10% of the long dimension and about 40% of the long dimension, or about the short dimension 604.

As further depicted, a third opening 610c may be offset from the second opening 610b (e.g., in additional to being offset from the first opening 610a). For example, the third opening 610c may be offset from the second opening 610b by substantially the same amount as the second opening 610b is offset from the first opening 610a. In some embodiments, the offset between the third opening 610c and the second opening 610b may be a different offset (e.g., smaller offset or larger offset) than the offset between the first opening 610a and the second opening 610b.

In some embodiments, the gradual or staggered offsets of each opening 610 may allow for a greater flow restriction when the port 600 initially opens, with the stoppers 408 beginning to move and initially only exposing a small portion of the area of the first opening 610a. As the stoppers 408 continue to move, the exposed area of the first opening 610a may continue to increase until the stoppers 408 reach the end 606 (e.g., a leading end) of the second opening 610b (e.g., intersect the end 606 of the second opening 610b). As the stoppers 408 continue to move, an area of the second opening 610b may begin to be exposed as the exposed area of the first opening 610a continues to expand. Both the exposed areas of the first and second openings 610a, 610b may continue to expand until the stoppers 408 reach the end 606 of the second opening 610b. As the stoppers 408 continue to move, an area of the third opening 610c may begin to be exposed as the exposed areas of the first and second openings 610a, 610b continue to expand. The exposed areas of the first, second, and third openings 610a, 610b, 610c may continue to expand until the stoppers 408 reach the opposite end 607 of the first opening 610a (e.g., intersect the opposite end 607 of the first opening 610a). The entire area of the first opening 610a may be exposed and the stoppers 408 may continue to move with the exposed areas of the second and third opening 610b, 610c continuing to grow until the stoppers 408 reach the opposite end 607 of the second opening 610b. The entire areas of the first and second openings 610a, 610b may be exposed and the stoppers 408 may continue to move with the exposed area of the third opening 610c continuing to grow until the stoppers 408 reach the opposite end 607 of the third opening 610c. Once the areas of all of the openings 610 are exposed the port 600 may be fully open.

The port 600 may operate in a similar, reverse manner when the stoppers 408 move in an opposite direction beginning with the port 600 fully open and the areas of all of the openings 610 exposed, and finishing with the port 600 substantially closed and each of the openings 610 substantially closed (e.g., blocked or obstructed by the stoppers 408 (FIG. 4)).

In some embodiments, the staggering of the openings 610 may enable the stoppers 408 to traverse the openings at greater speed as the staggered openings 610 will open one at a time, thereby, reducing the amount of high pressure fluid that is enabled to pass through the openings 610. Moving the stoppers 408 at greater speeds may enable faster cycles of the valve. In some embodiments, the greater speeds may reduce the amount of fluid jetting and/or cavitation that occurs when the exposed area of the opening 610 is relatively smaller as the time period with such a small exposed area is reduced with the faster moving stoppers 408.

In some embodiments, the openings 610 may be staggered along the outer circumference where two or more openings 610 may have aligned leading ends while still being offset form the leading ends of the remaining openings 610.

In some embodiments, the stoppers 408 may be controlled with a varying speed to regulate the flow through the openings 610. For example, the stoppers 408 may move at a slower rate when the stoppers 408 are only interacting with one opening 610, and at a faster rate when the stoppers 408 are interacting with two openings 610, and at an even faster rate when the stoppers 408 are interacting with three openings 610, etc. As the stoppers 408 interact with more openings, the pressure differential across the port 600 may decrease and a flow coefficient (e.g., flow capacity (Cv), etc.) may increase as the exposed areas of the openings 410 increase.

In some embodiments, the stoppers 408 may be controlled with a varying speed such that the increase in the flow coefficient may be substantially constant (e.g., approaching linear) with respect to time. For example, the stoppers 408 may initially move at a high rate of speed, may transition to a lower rate of speed when encountering one or more of the openings 610, and then may increase back to a higher rate of speed after flow through the openings 610 has stabilized. In some embodiments, the stoppers 408 may initially move at a high rate of speed when only traversing the first opening 610a. The speed of the stoppers 408 may decrease as the stoppers 408 begin to traverse the second opening 610b to compensate for the increase in flow coefficient that may result from the added area of the second opening 610b. The speed of the stoppers 408 may further decrease as the stoppers 408 begin to traverse the third opening 610c to compensate for the increase in the flow coefficient that may result from the added area of the third opening 610c. The speed of the stoppers 408 may remain constant as the stoppers 408 begin to traverse the third opening 610c. For example, the increases in the flow coefficients of the first opening 610a and/or the second opening 610b may begin to decrease such that the change in the combined flow coefficient of the port 600 may continue to increase at a substantially constant rate as the third opening 610c begins to open. As the stoppers 408 continue to traverse the openings 610, the increases in the flow coefficient may decrease until the flow coefficient is substantially constant as the openings 610 approach a fully open position (e.g., substantially open, at least partially open, etc.). As the increases in the flow coefficient decrease the speed of the stoppers 408 may increase to maintain a substantially constant increase in the flow coefficient with respect to time.

In some embodiments, the variable speed of the stoppers 408 may provide for greater control of the flow coefficient of the port 500 by traveling at reduced speed when the exposed area of the openings is relatively small. As the exposed area of the opening 510 increases, the rate of change in the flow capacity rating (e.g., the flow coefficient) may begin to decrease. As the exposed area of the opening 510 approaches a maximum area (e.g., substantially fully open), the flow coefficient may remain substantially constant (e.g., plateau, reach steady-state). The speed of the stoppers 408 may increase as the rate of change in the flow coefficient decreases such that the flow coefficient may change at a substantially constant rate (e.g., approaching linear with respect to time).

In some embodiments, in addition to or alternative from the staggering of the openings 410, 510, 610, one or more of the stoppers 408 may be shaped to gradually expose the openings 410, 510, 610 to fluid flow. For example, an end of the plug may comprise an offset or rounded surface (e.g., slanted, arcuate, scalloped, rounded, circuitous, tortuous, transverse surfaces) that will gradually expose the openings 410, 510, 610.

As discussed above, opening and closing valves where fluids are operating at high pressures may result in pressure pulsations (e.g., water hammer) that can result in damage to components in the system when high pressure is suddenly introduced or removed from the system. Further, high pressure differentials across the valve port 500 may cause fluid jetting and/or cavitation (e.g., sudden vaporization) when the exposed area of the openings 510 is relatively small. If the stoppers 408 move at a reduced speed when the exposed area of the openings 510 is small (e.g., at initial opening or final closing), it may result in fluid jetting and/or cavitation for longer periods of time which may result in damage to internal components of the system. However, by varying the speed of the stoppers 408 and/or varying the geometry (e.g., spacing) of the openings 510 in accordance with embodiments of the instant disclosure, may enable the reduction of fluid jetting, cavitation, and pressure pulsations during the opening and/or closing of the valve assembly.

Now referring to FIGS. 1 and 2. In some embodiments, the pressure exchanger 104 may be formed from multiple linear pressure exchangers 200 operating in parallel. For example the pressure exchanger 104 may be formed from two or more pressure exchangers (e.g., three, four, five, or more pressure exchangers stacked in a parallel configuration. In some embodiments, the pressure exchanger 104 may be modular such that the number of linear pressure exchangers 200 may be changed by adding or removing sections of linear pressure exchangers based on flow requirements. In some embodiments, an operation may include multiple systems operating in an area and the pressure exchangers 104 for each respective system may be adjusted as needed by adding or removing linear pressure exchangers from other systems in the same area.

Embodiments of the instant disclosure may provide systems including pressure exchangers that may act to reduce the amount of wear experienced by high pressure pumps, turbines, and valves in systems with abrasive, caustic, or acidic fluids. The reduced wear may enable the systems to operate for longer periods with less down time and costs associated with repair and/or replacement of components of the system resulting in increased revenue or productivity for the systems. In operations such as fracking operations, where abrasive fluids are used at high temperatures, repairs, replacement, and downtime of components of the system can result in millions of dollars of losses in a single operation. Embodiments of the present disclosure may result in a reduction in wear experienced by the components of systems where abrasive, caustic, or acidic fluids are used at high temperatures. The reduction in wear will generally result in cost reduction and increased revenue production.

In some embodiments, increasing flow restriction across openings in a valve handling a fluid a relatively high pressure may result in relatively improved control of the flow properties (e.g., pressure, flow rate, etc.). Embodiments of the present disclosure may enable a valve to take advantage of flow restrictions through the opening in the valve, by varying the speed of an actuator in the valve and/or by openings configured to provide a gradual introduction of high pressure fluid through the openings, which may reduce abrupt pressurization and jetting fluid velocities that cause cavitation and fluid jetting erosion, thereby reducing wear on components.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope of the disclosure as contemplated by the inventors.

What is claimed is:

1. A device for exchanging pressure between at least two fluid streams, the device comprising:
   at least one high pressure inlet for receiving a first fluid at a first higher pressure;
   at least one low pressure inlet for receiving a second fluid at a lower pressure;
   at least one high pressure outlet for outputting the second fluid at a second higher pressure that is greater than the lower pressure;
   at least one low pressure outlet for outputting the first fluid at another lower pressure that is less than the first higher pressure;
   at least one tank positioned between the at least one high pressure inlet and the at least one high pressure outlet; and
   a valve device comprising a valve actuator, the valve device comprising offset openings positioned along a path of one or more valve members that are moved by the valve actuator, the offset openings configured to selectively and gradually place the at least one high pressure inlet in communication with the at least one tank as the valve actuator moves at variable rates in order selectively fill and empty the at least one tank, a major length of the offset openings being substantially aligned with the path of the one or more valve members, wherein leading ends of each of the offset openings are positioned such that, when the one or more valve members travels along the path of the one or more valve members, a leading side of the one or more valve members crosses one or more of the leading ends of the offset openings only on one lateral side of the valve device.

2. The device of claim 1, wherein the valve actuator is a linear valve actuator configured to move the one or more valve members along a linear path, and wherein the offset openings are staggered along the linear path of the one or more valve members.

3. The device of claim 1, wherein the valve device is configured to:
move the valve actuator at a first speed as the one or more valve members approach one opening of the offset openings between the at least one high pressure inlet and the at least one low pressure inlet; and
reduce a velocity of the valve actuator from the first speed to a second, lower speed as the one or more valve members traverse the opening.

4. The device of claim 1, wherein the leading ends of each of the offset openings are axially offset along an annular shaped housing of the valve device through which the path of the one or more valve members is defined.

5. A device for exchanging pressure between at least two fluid streams, the device comprising:
at least one high pressure inlet for receiving a first fluid at a first higher pressure;
at least one low pressure inlet for receiving a second fluid at a lower pressure;
at least one high pressure outlet for outputting the second fluid at a second higher pressure that is greater than the lower pressure;
at least one low pressure outlet for outputting the first fluid at another lower pressure that is less than the first higher pressure;
at least one tank positioned between the at least one high pressure inlet and the at least one high pressure outlet and a valve device comprising a valve actuator, the valve device comprising offset openings positioned along a path of one or more valve members that are moved by the valve actuator, the offset openings configured to selectively and gradually place the at least one high pressure inlet in communication with the at least one tank as the valve actuator moves at variable rates in order selectively fill and empty the at least one tank, a major length of the offset openings being substantially aligned with the path of the one or more valve members, wherein leading ends of each of the offset openings are positioned such that, when the one or more valve members travels along the path of the one or more valve members, a leading side of the one or more valve members only crosses a portion of one of the leading ends of the offset openings at a time.

6. A method of operating a device for exchanging pressure between at least two fluid streams, the method comprising:
receiving a fluid at a first higher pressure through a high pressure inlet of the device;
receiving a downhole fluid at a lower pressure though a low pressure inlet into at least one tank;
placing the fluid at the first higher pressure in communication with the downhole fluid at the lower pressure by moving a valve member with an actuator of the device in order to pressurize the downhole fluid to a second higher pressure that is greater than the lower pressure;
moving the actuator of the device at a first speed as the valve member approaches an opening between the high pressure inlet and the at least one tank; and reducing a velocity of the actuator of the device from the first speed to a second, lower speed as the valve member traverses the opening.

7. The method of claim 6, further comprising increasing the velocity of the actuator of the device from the second, lower speed back to substantially the first speed as the valve member passes the opening.

8. The method of claim 7, further comprising, after the valve member moves past the opening, reversing a direction on the valve member to again traverse the opening.

9. The method of claim 8, further comprising reducing the velocity of the actuator of the device to substantially the second, lower speed as the valve member again traverses the opening.

10. The method of claim 6, further comprising decreasing a speed of the valve member as the high pressure inlet is placed into communication with the at least one tank through the opening.

11. The method of claim 6, further comprising traversing additional openings after traversing the opening, the additional openings and the opening collectively defining a set of staggered openings between the high pressure inlet and the at least one tank.

12. The method of claim 6, further comprising gradually removing the fluid at the first higher pressure from the device and into the at least one tank through the opening while the valve member traverses the opening.

13. The method of claim 6, further comprising gradually introducing the fluid at the first higher pressure into the device through another opening while the valve member traverses the another opening.

14. The method of claim 13, further comprising supplying the fluid at the first higher pressure into the device through the another opening from a pump.

15. A method of operating a device for exchanging pressure between at least two fluid streams, the method comprising:
receiving a fluid at a first higher pressure into a high pressure inlet of the device;
placing the fluid at the first higher pressure in communication with another fluid at a lower pressure by moving an actuator of the device in order to pressurize the another fluid to a second higher pressure that is greater than the lower pressure; and
reducing a velocity of a valve member with the actuator from a first speed to a second, lower speed as the valve member approaches and traverses an opening of the device.

16. The method of claim 15, further comprising gradually removing the fluid at the first higher pressure from the device into at least one tank through the opening while the valve member traverses the opening.

17. The method of claim 16, further comprising gradually introducing the fluid at the first higher pressure into the device through another opening while the valve member traverses the another opening.

18. The method of claim 15, further comprising increasing the velocity of the valve member with the actuator from the second, lower speed back to substantially the first speed as the valve member moves past the opening.

19. The method of claim 15, further comprising, after the valve member moves past the opening, reversing a direction on the valve member to again traverse the opening.

20. The method of claim 19, further comprising reducing the velocity of the valve member with the actuator to substantially the second, lower speed as the valve member again traverses the opening.

* * * * *